United States Patent
Zhu et al.

(10) Patent No.: US 11,180,681 B2
(45) Date of Patent: Nov. 23, 2021

(54) ACTINICALLY CURABLE ADHESIVE COMPOSITION WITH IMPROVED PROPERTIES

(71) Applicant: SUN CHEMICAL CORPORATION, Parsippany, NJ (US)

(72) Inventors: Xiaobo Zhu, Nutley, NJ (US); Ralph Arcurio, Bridgewater, NJ (US); Mathew Mathew, Cedar Grove, NJ (US); Juanita Parris, Montvale, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 16/757,142

(22) PCT Filed: Oct. 25, 2018

(86) PCT No.: PCT/US2018/057472
§ 371 (c)(1),
(2) Date: Apr. 17, 2020

(87) PCT Pub. No.: WO2019/084243
PCT Pub. Date: May 2, 2019

(65) Prior Publication Data
US 2020/0339838 A1 Oct. 29, 2020

Related U.S. Application Data

(60) Provisional application No. 62/576,824, filed on Oct. 25, 2017.

(51) Int. Cl.
| | | |
|---|---|---|
| B29D 22/00 | (2006.01) | |
| C08F 2/46 | (2006.01) | |
| C08G 61/04 | (2006.01) | |
| C09J 4/06 | (2006.01) | |
| B32B 7/12 | (2006.01) | |
| B32B 27/10 | (2006.01) | |
| B32B 27/32 | (2006.01) | |
| B32B 27/36 | (2006.01) | |
| C08G 18/10 | (2006.01) | |
| C08G 18/32 | (2006.01) | |
| C08G 18/48 | (2006.01) | |
| C08G 18/66 | (2006.01) | |
| C08G 18/75 | (2006.01) | |

(52) U.S. Cl.
CPC .................. *C09J 4/06* (2013.01); *B32B 7/12* (2013.01); *B32B 27/10* (2013.01); *B32B 27/32* (2013.01); *B32B 27/36* (2013.01); *C08G 18/10* (2013.01); *C08G 18/3206* (2013.01); *C08G 18/4854* (2013.01); *C08G 18/6674* (2013.01); *C08G 18/755* (2013.01); *B32B 2250/40* (2013.01); *B32B 2255/12* (2013.01); *B32B 2255/26* (2013.01); *B32B 2439/06* (2013.01); *B32B 2439/70* (2013.01); *B32B 2439/80* (2013.01)

(58) Field of Classification Search
CPC ......... B32B 27/32; B32B 27/36; B32B 27/10; B32B 7/12; B32B 2255/26; B32B 2255/12; B32B 2439/80; B32B 2439/06; B32B 2439/70; B32B 2250/40; C09J 4/06; C09J 4/00; C08G 18/3206; C08G 18/4858; C08G 18/6674; C08G 18/10; C08G 18/755; C08G 18/3228; C08G 18/2865; C08F 290/067
USPC ........ 428/36.91, 36.9, 35.7, 34.1; 522/6, 71, 522/189, 184, 1; 520/1
See application file for complete search history.

(56) References Cited

U.S. PATENT DOCUMENTS

| | | | |
|---|---|---|---|
| 6,737,477 B1 | 5/2004 | Figge | |
| 7,928,161 B2 | 4/2011 | Bhattacharjee et al. | |
| 2004/0102595 A1 | 5/2004 | Schwarte et al. | |
| 2012/0128991 A1 | 5/2012 | Kollbach et al. | |
| 2013/0199956 A1 | 8/2013 | Hunter et al. | |
| 2016/0304742 A1 | 10/2016 | France | |
| 2016/0362515 A1* | 12/2016 | Klang | C08G 18/6637 |
| 2017/0049683 A1 | 2/2017 | Klang et al. | |

FOREIGN PATENT DOCUMENTS

| | | |
|---|---|---|
| EP | 2 226 342 A1 | 9/2010 |
| WO | WO 2016096503 A1 | 6/2016 |

OTHER PUBLICATIONS

PCT International Search Report issued in PCT/US2018/057472 dated Jan. 22, 2019.
Written Opinion of the International Searching Authority issued in PCT/US2018/057472 dated Jan. 22, 2019.
(Continued)

Primary Examiner — Jessica Whiteley
(74) Attorney, Agent, or Firm — Marian E. Fundytus; Ostrolenk Faber LLP

(57) ABSTRACT

Described herein is an actinically curable adhesive composition, suitable for sealing flexible packaging, that includes an inert urethane polymer and an ethylenically unsaturated monomer component selected from at least one monofunctional ethylenically unsaturated monomer, at least one multifunctional ethylenically unsaturated monomer, and a combination thereof, wherein the ethylenically unsaturated monomer component disperses the inert urethane polymer. The compositions are suitable for forming flexible packaging materials for foods and other materials, particularly sensitive materials. Also described are flexible packaging materials and a method for preparing an actinically curable adhesive composition.

21 Claims, No Drawings

(56) References Cited

OTHER PUBLICATIONS

International Preliminary Report on Patentability issued in PCT/US2018/057472 dated Nov. 19, 2019.
Singh, et al., Journal of Adhesion Science and Technology, vol. 27, No. 14, 1511-1524 (2013).
European Search Report issued in counterpart EP application No. 18869703.1 dated Jun. 29, 2021.

* cited by examiner

ACTINICALLY CURABLE ADHESIVE COMPOSITION WITH IMPROVED PROPERTIES

The present application is a § 371 National Stage application based on PCT/US2018/057472 filed Oct. 25, 2018, which claims priority to U.S. Provisional Patent Application No. 62/576,824 filed Oct. 25, 2017, the subject matter of each of which is incorporated herein by reference in their entirety for all purposes.

BACKGROUND OF THE INVENTION

Actinically curable adhesives, such as those used to create bonded laminates used in flexible packaging, form strong bonds upon curing, such as by electron beam (EB)-curing and ultraviolet (UV)-curing. There are different technologies used to prepare laminates that are used in laminated packaging, Such technologies include extrusion lamination and adhesive lamination. Extrusion lamination involves melting and depositing a layer of plastic resin such as polyethylene between two webs of packaging materials. The different types of adhesives currently used to laminate flexible packing materials include: 1) one-component solvent base; 2) two-component solvent base; 3) one-component water base; 4) two-component water base; and 5) two-component solventless.

Organic solvent base adhesives are limited in that they may include volatile organic compounds (VOCs), require expensive incineration or recovery equipment; may be flammable, and may retain residual solvents in the packaging.

Water based adhesives may be limited in that they may require the use drying equipment after being applied to the substrate materials. Further, the applied to dry the adhesives can negatively impact the quality and performance of the adhesive. The rate of drying the adhesive may be affected by the ambient humidity levels. Further, starting and pausing production due to adhesive drying on the application equipment may be difficult to manage.

Two component systems (solvent-based, water-based, or solventless) are disadvantageous in that the two components have to be mixed consistently and thoroughly. Further, the pot life of the mixed components is limited. Still further, the time required for the two components to react and achieve the final adhesive properties is lengthy (i.e., 2 to 5 days). Other limitations associated with two component solventless adhesives include: the need for heated application equipment and the presence of residual toxic aromatic amines, which are byproducts of isocyanate-based curing systems.

Adhesives that are curable with actinic radiation may potentially provide numerous advantages over the aforementioned flexible packaging laminating adhesives. Such adhesives may provide stable one-part compositions, contain little or no volatile organic compounds (VOCs), and provide full adhesive performance immediately upon cure.

UV curable laminating adhesives require at least one layer of packing material that is sufficiently transparent to allow penetration of UV light to cure the adhesive. EB radiation has the advantage of being able to penetrate opaque or printed packaging materials in order to cure the adhesive. Radiation-curable laminating adhesives for flexible packaging should provide sufficient bond strength and chemical resistance (preferably, the laminate substrate would fail before the adhesive fails). The adhesive must have little to no odor, not taint the material in the packaging (e.g., not contaminate or adulterate the packaged material), and exhibit a small component migration in order to be suitable for use in the packaging of foods and pharmaceuticals. Component migration refers to the migration of components out of the packaging and into the surrounding environment. Migratable components include unreacted monomer and photoinitiator.

Radiation-curable adhesives, inks, and coatings contain low molecular weight reactive monomers and oligomers that are converted to polymers of higher molecular weight upon exposure to UV or EB radiation. While the conversion rate of the low molecular weight monomer or oligomers is generally high, it may be the case that some residual amount of monomer or oligomers is not converted. The residual unconverted monomer or oligomers have been known to cause odor and taint. Further, unreacted monomer may be a migratable component.

References that may be of interest include: US 2012/0128991, EP 2 226 342, and Singh, et al., *Journal of Adhesion Science and Technology*, Vol. 27, No. 14, 1511-1524 (2013).

SUMMARY OF THE INVENTION

Described herein is an actinically curable adhesive composition suitable for sealing flexible packaging that solves the problems discussed above. The actinically curable adhesive composition comprises:
  an inert urethane polymer; and
  an ethylenically unsaturated component selected from at least one monofunctional ethylenically unsaturated monomer or oligomer, at least one multifunctional ethylenically unsaturated monomer or oligomer, and combinations thereof, wherein the ethylenically unsaturated component disperses the inert urethane polymer.

In one aspect, the inert urethane polymer comprises a polyol and a polyisocyanate.

In one aspect, the polyol is a diol.

In one aspect, the polyisocyanate is a diisocyanate

In one aspect, the inert urethane polymer comprises a first polyol and a second polymeric polyol, and at least one polyisocyanate.

In one aspect, the inert urethane polymer comprises a first diol and a second polymeric diol, and at least one polyisocyanate.

In one aspect, the polyol comprises a first diol having a molecular weight preferably of 50 to 2000 Daltons; and a polymeric diol preferably having a weight average molecular weight preferably of 425 to 3000 Daltons.

In one aspect, the first diol is a diol monomer.

In one aspect, the ethylenically unsaturated component comprises at least one monofunctional ethylenically unsaturated monomer or oligomer and at least one multifunctional ethylenically unsaturated monomer or oligomer.

In one aspect, the inert urethane polymer is present in the adhesive composition an amount of 10 wt % to 90 wt %, preferably 25 wt % to 70 wt %.

In one aspect, the viscosity of the uncured adhesive composition is 3 poise to 70 poise, preferably 2 poise to 9 poise.

In one aspect, the actinically curable adhesive composition further comprises a chain extending component.

In one aspect, the chain extending component is selected from diamines, diols, and combinations thereof.

In one aspect, the chain extending component is selected from a diamine.

In one aspect, the chain extending component is present in an amount of 60%-140%, 70%-90%, and preferably 80% based on the equivalents of unreacted isocyanate (e.g., —NCO) groups on the prepolymer. If the diamine extension is less than 100%, the —NCO groups remaining on the chain-extended urethane polymers can be end-capped with a mono-functional amine as a terminator group.

In one aspect, the chain extending component further comprises a monoamine. The monoamine moiety added by the chain extending reaction may terminate (e.g., end cap) the inert urethane polymer.

In one aspect, the actinically curable adhesive composition further comprises at least one photoinitiator.

In one aspect, the actinically curable adhesive composition is solventless.

In one aspect, the actinically curable adhesive composition is a one component adhesive system.

In one aspect, the actinically curable adhesive composition is solventless and a one component adhesive system.

In another aspect, described herein is a flexible package comprising flexible substrate material configured to form a package, wherein ends of flexible substrate material are bonded together with the actinically curable adhesive composition described herein. In one aspect the flexible substrate material is bonded together by exposing the actinically curable adhesive composition to actinic radiation.

In one aspect, the flexible packaging comprises at least two flexible sheets configured to form a package, the flexible sheets having ends bonded together in a seam with the adhesive composition described herein. In one aspect the flexible sheets are bonded together by exposing the actinically curable adhesive composition to actinic radiation.

In another inventive aspect, described herein is a laminate structure comprising a first substrate material bonded to a second substrate material with the actinically curable adhesive composition of any preceding claim, which composition has been exposed to actinic radiation.

In another inventive aspect, described herein is a method for preparing an actinically curable adhesive composition, suitable for sealing flexible packaging, comprising the steps of:

(A) synthesizing a urethane prepolymer from at least one polyol and at least one polyisocyanate;

(B) chain extending the urethane prepolymer in the presence of an ethylenically unsaturated component to provide an inert urethane polymer, wherein the ethylenically unsaturated component is selected from at least one monofunctional ethylenically unsaturated monomer or oligomer, at least one multifunctional ethylenically unsaturated monomer or oligomer, and combinations thereof, wherein the ethylenically unsaturated component disperses the inert urethane polymer.

In another aspect, in the chain extending step, 60 to 140%, preferably 70 to 90%, and more preferably 80% equivalents of the diamine are used, based on the equivalents of unreacted isocyanate groups on the urethane prepolymer.

In another aspect, the above method, the chain extending component reacted with the urethane prepolymer comprises diamine and monoamine.

"Actinically curable", as used herein refers to photo-curing or electron beam-curing. "Photo-curing" includes exposure to light effective to cause curing, such as ultraviolet (UV) light emitted by a UV light source (such as a conventional UV light source or a UV-LED light source). Actinic radiation includes energy emitted from an electron beam (EB) source and an ultraviolet (UV) light source.

The actinically curable adhesives described herein are comprised of an inert urethane polymer dispersed in an ethylenically unsaturated component selected from at least one monofunctional ethylenically unsaturated monomer or oligomer, at least one multifunctional ethylenically unsaturated monomer or oligomer, and combinations thereof, wherein the ethylenically unsaturated component disperses the inert urethane polymer. The inert urethane polymer comprises a polyol and a polyisocyanate. The inert urethane polymer comprises 10 wt % to 90 wt % of the adhesive composition, preferably 25 wt % to 70 wt % thereof. When the adhesive composition is cured, e.g., by exposure to actinic radiation, strong lamination bonds are formed between the flexible substrate materials used to make flexible packaging applications.

"Inert urethane polymer", as used herein, means that the urethane polymer does not have reactive acrylate or methacrylate groups. That is, no reactive acrylate or methacrylate groups are present on the inert urethane polymer.

The inventive adhesive for package application has variety of advantages such as fast curing, low shrinkage, green tack etc.

The present adhesive composition, in which an inert polyurethane resin is dispersed in the ethylenically unsaturated component and then cured, is superior to conventional two part adhesives. One advantage is that curing time is faster. That is, the present adhesive compositions do not require the long curing times needed for conventional two part adhesives, e.g., adhesives in two parts mixed together before application to substrate. Strong lamination bonds are formed much more rapidly with the present adhesive compositions than with conventional two part adhesives.

In one aspect of the present invention, the actinically curable adhesives are cured by electron beam curing, which may result in a higher conversion of monomer (i.e., which can provide a more efficient cure). The adhesive composition cured by election beam does not require the inclusion of a photoinitiator to carry out the curing reaction and, unlike forming bonds on curing by exposure to UV energy, can be used to form bonds on curing between non clear, e.g., non-transparent (i.e., opaque) substrate materials. That is, UV curing requires the substrates to be clear so that the UV light can penetrate through the substrate material. With EB curing, the electron beam emits higher energy that can easily penetrate into non clear film.

The present actinically curable adhesive compositions do not require viscosity adjustment and have longer shelf lives compared to solvent-based or solvent-free adhesives. This is particularly the case with EB-curable adhesives, which have longer shelf-lives since they do not have to include reactive photoinitiators.

Actinically curable adhesive compositions provide advantages over solvent-based, water-based and solventless adhesive systems. Actinically curable adhesive compositions immediately form strong bonds between the laminate layers after curing. Actinically curable adhesive compositions can be applied at room temperature. Actinically curable adhesive compositions do not contain free isocyanates, and exhibit long adhesive shelf-life. In contrast to solvent-based adhesives, the presently described actinically curable adhesives do not contain VOCs.

The presently described actinically curable adhesives do not contain free isocyanates and do not contain aromatic amines, which can be toxic. Further, isocyanates tend to absorb moisture which can compromise properties of the adhesive and the quality of the cure.

The actinically curable adhesives can be used at room temperature.

Due to the presence of inert urethane polymer, the actinically cured adhesives exhibit little to no film shrinkage after curing. This provides a significant advantage over art-known adhesives. Further, the relatively high molecular weight inert polyurethane polymer in the adhesive is less likely to absorbed by the board when applied.

One advantage offered by the presently described actinically curable adhesives is that they provide sufficient green tack, or bond strength. Green tack is less likely to be provided by conventional electron beam-curable adhesives, which are understood to not contain polymeric materials that provide tack (in other words, conventional adhesives only include monomer and oligomer, which do not supply tack). Tack refers to the ability of two materials to resist separation after their surfaces are brought into contact under pressure. Green Tack or strength is the ability of an adhesive to hold two surfaces together when they are brought into contact and before the adhesive develops its ultimate bond properties when it is cured.

Conventional electron beam-curable adhesives do not exhibit green tack (due to low molecular weight) and is difficult to control web tension when laminating.

DETAILED DESCRIPTION OF THE INVENTION

In one aspect, the inert polyurethane is produced in two steps. In the first step, a urethane prepolymer is produced and in the second step the urethane prepolymer is extended in a chain extending reaction that, for example takes place between the urethane prepolymer, a diamine, and optionally a monoamine.

In the first step, the urethane prepolymer is synthesized from at least one polyol and at least one polyisocyanate. The resulting urethane pre-polymer is dispersed into monomer or monomer mixture before the chain extension step. Ethylene diamine is used to chain extend the pre-polymer and. Dibutyl amine and n-butyl amine may also be used.

Polyisocyanates

At least one polyisocyanate is employed in the prepolymer reaction. In one aspect, one polyisocyanate compound is employed. In another aspect, two or more polyisocyanate compounds are employed. Suitable polyisocyanates include aromatic diisocyanates, aliphatic diisocyanates, 4,4'-diphenylmethane diisocyanate; 4,4'-dicyclohexyl diisocyanate, hexamethylene diisocyanate; meta-tetra methylene-xylene diisocyanate; isophorone diisocyanate (IPDI); toluene diisocyanate (TDI) and isomers thereof, 1,5-naphthylene diisocyanate, 2,4- or 4,4'-diphenylmethane diisocyanate (MDI), hydrogenated 2,4-diphenylmethane diisocyanate (H12MDI), hydrogenated 4,4'-diphenylmethane diisocyanate (H12MDI), xylylene diisocyanate (XDI), tetramethyl xylylene diisocyanate (TMXDI), 4,4'-diphenyl dimethylmethane diisocyanate, di-diphenylmethane diisocyanate, tetraalkylene diphenylmethane diisocyanate, 4,4'-dibenzyl diisocyanate, 1,3-phenylene diisocyanate, 1,4-phenylene diisocyanate, the isomers of toluene diisocyanate (TDI), 1-methyl-2,4-diisocyanatocyclohexane, 1,6-diiso-cyanato-2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexylmethane diisocyanate, cyclo-hexane-1,4-diisocyanate, ethylene diisocyanate, phthalic acid-bis-isocyanatoethyl ester; diisocyanates containing reactive halogen atoms, such as 1-chloromethylphenyl-2,4-diisocyanate, 1-bromomethylphenyl-2,6-diisocyanate or 3,3-bis-chloromethylether4,4'-diphenyl diisocyanate, and mixtures thereof. IPDI is a preferred aliphatic diisocyanate. TDI is a preferred aromatic diisocyanate, more preferably used in isomer blends of toluene 2,4-diisocyanate/toluene 2,6-diisocyanate in proportions of 80/20 and 65/35 (w/w) respectively. The TDI isomers are toluene 2,4-diisocyanate and toluene 2,6-diisocyanate. In one aspect, 10 to 20 parts by weight diisocyanate component is preferably used.

Polyols

In one aspect of the present adhesive compositions, the polyol component of the inert urethane polymer in the described adhesive compositions is one or more diols. In another aspect, the polyol component of the inert urethane polymer in the described adhesive compositions comprises a first diol and a polymeric diol. It is preferred that the first diol have a molecular weight of 50 to 2000 Daltons. It is preferred that the polymeric diol have a weight average molecular weight of 425 to 3000 Daltons.

While these molecular weight ranges overlap, the first diol typically will have a lower molecular weight than the polymeric diol. However, in some instances the molecular weights of the first and polymeric diols may be substantially the same, such as when two polymeric diols having a molecular weight of 2000 Daltons or less are employed as the polyol component of the inert urethane polymer.

Preferably the diol component comprises 30 to 80 to molecular equivalents of polymeric diol for every 100 molecular equivalents of total diol in the diol component.

The first, or low molecular weight diol has a molecular weight of 50 to 2000 Daltons. The first low MW diol may preferably be selected from the group consisting of aliphatic diols, polyether diols and polycaprolactone diols which are preferably short-chain diols and/or are diols of molecular weight less than 2000 Daltons. Preferred first diols include 1,4-butanediol; 1,5-pentanediol; and alpha-hydro-omega hydroxy-poly(oxy-1,4-butyldiyl), which has a weight avg. molecular weight of 1000 Daltons. More than one diol meeting the description of the first, or low molecular weight diol, e.g., a mixture of first, or low molecular weight diols, may be used.

The polymeric diol preferably has a weight average molecular weight ranging from about 425 to about 3000 Daltons and is preferably selected from polyether diols and polycaprolactone diols. In the preparation of the urethane prepolymer, long chain polyether diols may be used, such as for example polytetrahydrafurans (pTHFs) having weight average molecular weights of 650, 1000 or 2000 Daltons. The polymeric diol component may also be polypropylene glycols (PPGs) of weight average molecular weights of 425, 725, 1025 or 2025 Daltons. A number of polycaprolactone diols having weight average molecular weights of 1000 to 2000 Daltons may also be used. The polymeric diol may also be alpha-hydro omega-hydroxy-poly (oxy-1,4-butyldiyl). The polymeric diol and the first, preferably lower molecular weight diol, make up the diol component of the prepolymer. In one aspect, the ratio of polymeric diol to first diol is 55:45 for 100 molecular equivalents of diol.

Each equivalent of the polymeric diol would typically have a greater molecular weight than an equivalent of the first diol. In one aspect, the urethane prepolymer is prepared from about 40 parts by weight of the polymeric diol and about 2 parts by weight first diol, along with 10 to 20 parts by weight polyisocyanate component (remainder being solvent).

Ethylenically Unsaturated Component

The ethylenically unsaturated component of the presently described actinically curable adhesive composition acts as a solvent for the urethane component (urethane prepolymer or chain extended urethane polymer). Examples of ethylenically unsaturated component include, for example, 2-hydroxyethyl acrylate, 2-[(butylcarbamoyl)oxy]ethyl acrylate, 4-hydroxybutyl acrylate, propoxylated neopentyl glycol diacrylate, amine-modified polyether acrylates, alkoxylated aliphatic diacrylate, alkoxylated neopentyl glycol diacrylate, 1,4-butanediol diacrylate, 1,3-butylene glycol diacrylate, cyclohexane dimethanol diacrylate, diethylene glycol diacrylate, dipropylene glycol diacrylate, 1,6-hexanediol diacrylate, neopentyl glycol diacrylate, polyester diacrylate, polyethylene glycol (200) diacrylate, polyethylene glycol (400) diacrylate, polyethylene glycol (600) diacrylate, propoxylated neopentyl glycol diacrylate, propoxylated (2) neopentyl glycol diacrylate, tetraethylene glycol diacrylate, tricyclodecane dimethanol diacrylate, triethylene glycol diacrylate and tripropylene glycol diacrylate and combinations thereof.

Examples of trifunctional monomer/oligomer that can be included as the ethylenically unsaturated component are, for example, ethoxylated (3) trimethylolpropane triacrylate, ethoxylated (6) trimethylolpropane triacrylate, ethoxylated (9) trimethylolpropane triacrylate ethoxylated (15)trimethylolpropane triacrylate, ethoxylated (20) trimethylolpropane triacrylate, pentaerythritol triacrylate, propoxylated (3) glyceryl triacrylate, propoxylated (3) glyceryl triacrylate, propoxylated (5.5) glyceryl triacrylate, propoxylated (3) trimethylolpropane triacrylate, propoxylated (6) trimethylolpropane triacrylate, trimethylolpropane triacrylate and tris-(2-hydroxyethyl)-isocyanurate triacrylate and combinations thereof.

Examples of tetrafunctional and pentafunctional monomer/oligomer that can be included as the ethylenically unsaturated component are, for example, di-(trimethylolpropane)-tetraacrylate, ethoxylated (4) pentaerythritol tetraacrylate, polyester tetraacrylate, dipentaerythritol pentaacrylate, pentaacrylate ester and pentaerythritol tetraacrylate and combinations thereof.

Oligomers with different levels of functionality that can be included as the ethylenically unsaturated component are, for example, epoxy acrylates, polyester acrylates, ethoxylated acrylates, unsaturated polyesters, polyamide acrylates, polyimide acrylates, and urethane acrylates (aliphatic and aromatic), and different types of methyl acrylates.

LAROMER® LR 8996 M, an amine-modified polyether acrylate oligomer available from BASF, is an example of a commercially available oligomer product suitable for use as an ethylenically unsaturated oligomer in the ethylenically unsaturated component.

Combinations of any of the above may be used as the ethylenically unsaturated component.

Diamine Extension

The urethane prepolymer is reacted with a chain extending agent (e.g., a difunctional amine) in ethylenically unsaturated component, e.g., an acrylate monomer, such as a monofunctional acrylate. In one aspect, the chain extending reaction is carried out with 60 to 140% equivalents of the diamine, based on the equivalents of unreacted isocyanate (—NCO) groups on the prepolymer to form the above described ethylenically unsaturated monomer soluble urethane polymer. More preferably, the chain extending reaction is carried out using about 70% to about 90% equivalents diamine based on unreacted —NCO groups. It is preferred that less than 100% equivalents of diamine is used to chain extend the prepolymer to form the monomer soluble poly (urethane/urea) of the present invention. In one aspect, it is particularly preferred that 80% equivalents diamine be used.

A number of diamines may be used including hydrazines and alkylene diamines such as methylene diamine, ethylene diamine, diamino cyclohexane, hexamethylene diamine, piperazine, isophorone diamine, hydrazines or the like, and mixtures thereof. Particularly preferred diamines are ethylene diamine, isophorone diamine, and mixtures thereof.

If the diamine extension is less than 100%, the —NCO groups remaining on the chain-extended urethane polymers can be end-capped (e.g., terminated) with a mono-functional amine as a terminator group. A number of mono-functional amines may be used including amino alcohols, ammonia, primary or secondary aliphatic, alicyclic, aromatic, araliphatic or heterocyclic amines, especially primary aliphatic amines such as n-butylamine and ethylamine. A preferred monoamine is n-butyl amine. It should be understood that not in all instances will a mono amine terminate or end cap the urethane prepolymer.

Photoinitiators

In one aspect, the actinically curable adhesive compositions described herein include one or more photoinitiators. Photoinitiators may be included when curing is carried out by exposure to UV-energy, such as UV-energy emitted by a UV light source.

Photoinitiators that can be included in the adhesive compositions include, for example: benzoin ethers, such as benzoin methyl ether, benzoin ethyl ether, and benzoin phenyl ether; alkylbenzoins, such as methylbenzoin, ethylbenzoin, propylbenzoin, butylbenzoin and pentylbenzoin; benzyl benzyl-dimethylketal; 2,4,5-triaryl-imidazole dimers, such as 2-(o-chlorophenyl)-4,5-diphenylimidazole dimer, 2-(o-fluorophenyl)-4,5-phenyl-imidazole dimer, 2-(o-methoxyphenyl)-4,5-diphenyl-imidazole dimer, 2-(/?-methoxy-phenyl)-4,5-diphenylimidazole dimer, 2,4-di (methoxy-phenyl)-5-phenyl-imidazole dimer and 2-(2,4-dimethoxyphenyl)-4,5-diphenyl-imidazole dimer; acridine derivatives such as 9-phenylacridine and 1,7-bis(9,9'-aridinyl)heptane; N-phenylglycine; benzophenones, anthraquinones, thioxanthones and derivatives thereof, including chloro-benzophenone, 4-phenylbenzophenone, trimethylbenzophenone, 3,3'-dimethyl-4methoxybenzophenone, 4,4'-dimethylamino-benzophenone, 4,4'-bis(diethyl-amino)-benzophenone, acrylated benzophenone, methyl-o-benzoyl benzoate, isopropyl hioxanthone, 2-chloro and 2-ethyl-thioxanthone, 2-benzyl-2-(dimethyl-amino)-4'-morpholino-butyrophenone and hydroxy benzophenone; acetophenone derivatives including 2,2-dimethoxy-2-phenyl-acetophenone, 2,2-diethoxyacetophenone, 2,2-dimethoxy-2-phenylacetophene, 1-hydroxycyclohexylacetophenone; 2-hydroxy-2-methyl-1-phenylpropanone; 4-benzoyl-4'-methyldiphenyl sulfide; ethyl 4-dimethyl-amino-benzoate; 2-ethylhydroquinone; (2,4,6-trimethylbenzoyl)diphenyl phosphine oxide (Lucerin TPO, available from BASF, Munich, Germany); ethyl(2,4,6-trimethyl-benzoyl-phenyl phosphinate; a-hydroxy ketone photoinitiators, such as 1-hydroxy-cyclohexyl-phenyl ketone (e.g., Irgacure® 184 available from Ciba Specialty Chemical (Hawthorne, N.Y.), 2-hydroxy-2-methyl-1-phenylpropanone, 2-hydroxy-2-methyl-1-(4-isopropyl-phenyl)propanone, 2-hydroxy-2-methyl-1-(4-dodecylphenyl)propanone, 2-hydroxy-2-methyl-1-henylpropanone and 2-hydroxy-2-methyl-1-[(2-hydroxyethoxy)-phenyl]-propanone; (2,6-dimethoxybenzoyl)-2,4,4-trimethylpentyl phosphine oxide (e.g., commercial blends Irgacure® 1800, 1850, and 1700 available from Ciba Specialty Chemical); 2,2-dimethoxyl-2-phenyl acetophenone (e.g. Irgacure® 651, available from Ciba Specialty Chemical); bisacylphosphine oxide photoinitiators, such as bis(2,4,6-trimethylbenzoyl)phenyl-phosphine oxide (e.g., Irgacure® 819 from Ciba Specialty Chemical), bis(2,6-dimethoxybenzoyl)-isooctyl-phosphine oxide and ethoxy(2,4,6-trimethyl-benzoyl) phenyl phosphine oxide (Lucerin® TPO-L from BASF). Combinations of photoinitiators, such as those identified herein, may be used.

The compositions prepared in accordance with Examples 1-3 below are effective actinically-curable adhesive compositions that include inert urethane polymer in monomer component. Still, additional ethylenically unsaturated component (e.g., monofunctional and/or multifunctional monomer or oligomer) may be added to the adhesive composition in order to improve its properties, such as after the completion of the chain extending step. The inclusion of additional ethylenically unsaturated component can improve curing and crosslinking in the adhesive component.

The actinically curable adhesive compositions described herein are well suited for use in forming flexible packaging from laminates of flexible substrate materials, in which the adhesive compositions bond the flexible substrate materials together in a laminate structure. For example, the flexible packaging may comprise two flexible sheets configured to form a package that are laminated together, with the adhesive material positioned between the two flexible sheets and forming a bond between the sheets. A single sheet of packaging material may also be used to form flexible packaging, in which the sheet is configured in the shape of a package and the ends thereof are laminated together with the adhesive material to form the bond between the ends of the sheet. It is possible that two or more sheets could be used to form flexible packaging according to the present principles. In whichever arrangement, exposing the adhesive composition to actinic radiation will form strong bonds in the laminate structure.

The adhesive compositions described herein can be used for form laminate structures with many different kinds of substrate materials. For example, the adhesive compositions can be used to form bonded laminates from materials such as, for example, styrene-butadiene-styrene (SBS), polyester, such as PET and PET-G, polypropylene, polyethylene, and pulp board laminates, such as Incada Exel board, which is a chemically treated pulp board laminate.

EXAMPLES

The following examples illustrate specific aspects of the present invention and are not intended to limit the scope thereof in any respect and should not be so construed.

Inventive Example 1: Preparation of Polyurethane in 2-Hydroxyethyl Acrylate

Step 1—Prepolymer:

201.15 g of polyTHF 2000 (poly(tetramethylene ether) glycol, available from BASF) having a weight average MW of 2000, 7.47 g of 1.2 butanediol and 0.06 g Tyzor TPT (titanium (IV) isopropoxide) as catalyst were pre-melted and charged in a 2 L 4-necked flask under a nitrogen blanket. 61.38 g of isophorone diisocyanate was added to the flask through an addition funnel with mixing. Once the isophorone diisocyanate was completely added, the flask was heated, and the temperature was increased in 5° C. increments to the range of 65° C.-70° C. Once the pre-polymer NCO % was between 3.1 and 3.5, as determined by titration (2.0N dibutyl toluene solution is used to quench the pre-polymer —NCO and then 1.0 N hydrochloric acid is used titrate the excess dibutyl amine; bromophenol blue is the indicator employed), the setup was switched to an air sparge and cooled to 60° C. to 65° C. 180.0 g 2-hydroxyethyl acrylate and 0.38 g 4-methoxyphenol were added through an addition funnel over 5 mins and then mixed for 10 min.

Step 2—Chain Extension:

242.0 g 2-hydroxyethyl acrylate and 0.38 g 4-methoxyphenol were added through an addition funnel over 5 minutes into the prepolymer solution (Step 1 above) and mixed for 10 min. Temperature drops to 30-35° C. Using two addition funnels, one with 4.9 g of ethylene diamine and the second with 5.2 g of dibutyl amine, both amines were simultaneously added over 5 mins and mixed for 45 min. The chain extension reaction is exothermic and temperature will increase to 45-50° C. The inert urethane polymer in the ethylenically unsaturated monomer (2-hydroxyethyl acrylate) was discharged. The adhesive composition was found to have a solids content of 40% and viscosity of 2500 cP.

The viscosity of the compositions provided in Examples 1-3 was determined with a Brookfield DV-E viscometer using a #64 spindle at 100 RPM at 25° C.

Inventive Example 2: Preparation of Polyurethane in 2-[(Butylcarbamoyl)Oxy]Ethyl Acrylate Step 1—Prepolymer:

1005.75 g of polyTHF 2000, 37.35 g of 1,4-butanediol and 0.08 g Tyzor TPT were pre-melted and charged in a 5 L 4-necked flask under a nitrogen blanket. 306.9 g of isophorone diisocyanate was added to the flask through addition funnel with mixing. The flask was heated after the isophorone diisocyanate was completely added. The temperature was increased in 5° C. increments to the range of 65° C.-70° C. Once the pre-polymer NCO % was between 3.1 and 3.5 as determined by the titration method described above, the setup was switched to an air sparge and cooled to 60° C. to 65° C. 900.0 g 2-[(butylcarbamoyl)oxy]ethyl acrylate and 1.9 g 4-methoxyphenol were added through an addition funnel over 5 mins and then mixed for 10 minutes.

Step 2—Chain Extension:

2351.6 g 2-[(butylcarbamoyl)oxy]ethyl acrylate and 1.9 g 4-methoxyphenol were added through an addition funnel over 5 minutes into the prepolymer solution (Step 1 above) and then mixed for 10 minutes. Temperature dropped to 30-35° C. Using two addition funnels, one with 25.7 g of ethylene diamine and the second with 27.7 g of dibutyl amine, the amines were added simultaneously over 5 mins and mixed for 45 min. The chain extension reaction is exothermic and temperature will increase to 45-50° C. The inert urethane polymer in ethylenically unsaturated monomer (2-[(butylcarbamoyl) oxy] ethyl acrylate) was discharged. The adhesive composition was found to have a solids content of 30% and viscosity of 6400 cP.

Inventive Example 3: Preparation of Polyurethane in 4-Hydroxybutyl Acrylate

Step 1—Prepolymer:

201.15 g of polyTHF 2000, 7.47 g of 1,4-butanediol and 0.02 g Tyzor TPT were pre-melted and charged in a 2 L 4-necked flask under a nitrogen blanket. 61.38 g of isophorone diisocyanate was added to the flask through addition funnel with mixing. The flask was heated after the isophorone diisocyanate was completely added, increasing the temperature in 5° C. increments to the range of 65° C.-70° C. Once the pre-polymer NCO % was between 3.1 and 3.5 as determined by the titration method described above, the setup was switched to an air sparge and cooled to 60° C. to 65° C. 180.0 g 4-hydroxybutyl acrylate and 0.38 g 4-methoxyphenol were added through an addition funnel over 5 mins and then mix for 10 minutes.

Step 2—Chain Extension:

242.0 g 4-hydroxybutyl acrylate and 0.38 g 4-methoxyphenol were added to the prepolymer solution (Step 1 above) through an addition funnel over 5 minutes and mixed for 10 minutes. Temperature dropped to 30-35° C. Using two addition funnels, one for 5.05 g of ethylene diamine and the second for 5.43 g of dibutyl amine, the amines were added simultaneously over 5 minutes and mixed for 45 minutes. The chain extension reaction is exothermic and temperature will increase to 45-50° C. The inert urethane polymer in ethylenically unsaturated monomer (4-hydroxybutyl acrylate) was discharged. The adhesive composition was found to have a solids content of 40% and viscosity of 4300 cP.

Evaluation of EB-Cured Adhesive 80 g of inert urethane polymer in ethylenically unsaturated monomer of Example 1 and 20 g of propoxylated neopentyl glycol diacrylate were added to 4 oz. plastic jars. The mixtures were homogenized by mixing in a DAK mixer for 2 minutes at 3000 RPM. Adhesive mixtures were made in the same way for the inert urethane polymers in ethylenically unsaturated monomers of Examples 2 and 3. The viscosities of the adhesive composition reported in Table 1 were measured with an AR1000 rotary viscometer at a shear rate of V1=1 seconds$^{-1}$ and V2=−100 seconds$^{-1}$ at 25° C.

TABLE 1

Adhesive Composition Viscosity Data

| Polymer | Adhesive A Inv. Example 1 | Adhesive B Inv. Example 2 | Adhesive C Inv. Example 3 |
|---|---|---|---|
| V1 (cP) | 1104 | 2245 | 1797 |
| V2 (cP) | 1011 | 2052 | 1697 |

Lamination structures were prepared with SBS board and polyester film by applying each of adhesives A, B, and C to SBS board and polyester film with a flexo hand proofer with a 7.0 BCM anilox. The adhesive-coated substrates were then laminated to another substrate layer of SBS board or polyester film by placing the second substrate layers over the adhesive layers and the applying pressure to the resulting laminate structures with a rubber roller. The structures were cured using a laboratory electron beam unit, Comet EBBEAM EB Lab-200 at a speed of 15 meters/min, at a dose of 30 KGY at 100 KV.

Lamination bond strengths of the laminates were determined as follows, employing the T-peel test of ASTM D1876. One inch wide strips of the laminates were cut. One end of the strips was delaminated using ethyl acetate solvent. The delaminated ends of the strips were attached to jaws of Instron (Mode I3342) tensile testing machine. The laminated structures were peeled apart at a separation speed of 12 inches/minute. The force required to peel the laminates was recorded as grams force per linear inch. The higher the recorded force, the stronger is the laminate bond.

The mode of failure of the laminates describes where the failure occurs. "Decal" failure means the adhesive failed to stick to the primary substrate and little to no force is needed to separate the two substrates. "Board tear" means the board tears in the Instron tester and the adhesive strength surpasses that of the board. "Adhesive failure" means the adhesive fails at the interface and that the laminate substrates separate in the Instron tester. "Board tear" is preferable to "decal" and "adhesive failure".

A commercial EB adhesive based on trimethylpropane triacrylate (TMPTA) monomer, was used as Comparative Example 1. In addition, two other comparative laminating adhesives examples were tested for lamination bond strength based on Sartomer CN131 (Comparative Example 2) and Sartomer CN3100 (Comparative Example 3). Sartomer CN131 is a low viscosity aromatic monoacrylate oligomer. Sartomer CN3100 is a low viscosity oligomer. Both are available from Sartomer Americas. They can be used as adhesive oligomers. Laminated structures were made using these adhesives as described above.

TABLE 2

Lamination Bond Strength Results

| Adhesive | Adhesive applied on polyester | Adhesive applied on board |
|---|---|---|
| Comparative Example 1 | 0 Decal | 0 Decal |
| Comparative Example 3 | 248 Decal | 0 Decal |
| Comparative Example 2 | 215 Decal | 0 Decal |
| Inv. Adhesive A (Table 1) | 417-585 Board Tear | 200-523 Adhesive Failure |
| Inv. Adhesive B (Table 1) | 450-595 Board tear | 240-587 Adhesive Failure |
| Inv. Adhesive C (Table 1) | 250-350 Adhesive failure | 190-350 Adhesive Failure |

The numeric values in the middle and right column are the grams force per linear inch determined in the T-peel test.

The cured adhesive holds the structure together, preventing delamination. The results show superior lamination bond strengths are exhibited by the presently described adhesive compositions A, B, and C after EB curing. In contrast, Comparative Example Adhesives 1-3, based on oligomer/monomer compositions without the inert urethane polymer, form bonds of insufficient strength, as shown by the "decal" failure grade.

Evaluation of the Bond Strengths of the Example 2 Adhesive Composition after UV-Curing Adhesives were prepared by blending two batches of the inert urethane polymer in ethylenically unsaturated monomer of Example 2 with GENORAD 26 (UV light inhibitor from Rahn AG) as a base and OMNIRAD 2959 photoinitiator (OMNIRAD 2959 is 1-[4-(2-hydroxyethoxyl)-phenyl]-2-hydroxy-methylpropanone and is available from IGM Resins). The mixtures were homogenized by heating to 140° F. in a Thermo Scientific Heraeus oven and dispersed on a Silverson L5M-A at 10,000 RPM for 5 minutes. The resultant solutions were then diluted with the oligomer LAROMER® LR 8996 M, an amine-modified polyether acrylate oligomer available from BASF, in order to create adhesives of viscosities less than 5 Poise (there is indication that this LAROMER® product is now available as LAROMER® PO 8996 M). Viscosities were measured on a Brookfield DV1 viscometer at 77° F. (at 25° C.) and 10 RPM. The batches are designated Examples D and E.

TABLE 3

Composition of adhesive samples and measured viscosities

| | Inventive Adhesive Example D | Inventive Adhesive Example E |
|---|---|---|
| BASE + LAROMER LR 8996 M | 48.8% | 66.6% |
| (Example 2) R4013-213 - batch 1 | 51.2% | — |
| (Example 2) R3931-215 - batch 2 | — | 33.4% |
| Total | 100.0 | 100.0 |
| Viscosity (Poise) | 4.94 | 4.77 |

Laminated structures were prepared by applying the batch 1 and 2 adhesive compositions to Incada Exel board (a chemically treated board laminate prepared from pulp) and to a corona treated oriented polypropylene film (the film was treated with 1 pass at 0.9 kW in a Corona Supplies Ltd type FP6000 corona treater). Another layer of film was then placed on top of the initial substrates and the adhesive drawn down between the two by the use of a OKBAR over the entire structure. The structure was cured using an IST UV curing rig with a mercury lamp at a dose of two passes at 645.2 mj/in².

Lamination bond strengths of the laminates were determined as follows, employing the T-peel test of ASTM D1876. Strips of the laminate were cut and the non-laminated ends attached to the jaws of a Lloyd Instruments LRX Plus materials testing machine. The structure was peeled apart at a separation speed of 9.84 inches per minute. The force required to peel the laminate was recorded in grams-force. This force was divided by the linear width of the laminate to give grams-force per linear inch. Again, the higher the force required, the stronger the lamination bond. The modes of failure are as described above (i.e., "decal", "board tear", and "adhesive failure"). Board tear is preferable to decal and adhesive failure.

A commercially available UV-laminating adhesive was used as Comparative Example 1.

TABLE 4

Lamination Bond Strength Results - Values are grams-force/inch

| Adhesive | Adhesive applied on board |
|---|---|
| Comparative Example 1 | 108 Board tear |
| Inv. Adhesive D | 108 Board tear |
| Inv. Adhesive E | 95 Board tear |

Table 4 shows that Inventive Examples D & E have comparable lamination bond strength to the Comparative Example 1 when used on board substrate.

Examples 4 and 5

The Example 4 UV adhesive was prepared by blending the inert urethane polymer in ethylenically unsaturated monomer of Example 1 with 2-[(butylcarbamoyl)oxy]ethyl acrylate with the photoinitiators diphenyl(2,4,6-trimethylbenzoyl)phosphine oxide and 2-hydroxy-2-methylpropiophenone. The Example 5 UV adhesive was prepared by blending the inert urethane polymer in ethylenically unsaturated monomer of Example 2 with 2-[(butylcarbamoyl)oxy] ethyl acrylate and with the same photoinitiators. Component amounts are shown below in Table 5.

TABLE 5

|  | Example 4 (wt %) | Example 5 (wt %) |
|---|---|---|
| Inventive Example 1 | 41 | 0 |
| Inventive Example 2 | 0 | 41 |
| 2-[(butylcarbamoyl)oxy]ethyl acrylate | 55 | 55 |
| diphenyl(2,4,6-trimethylbenzoyl)phosphine oxide | 1 | 1 |
| 2-Hydroxy-2-methylpropiophenone | 3 | 3 |

Adhesives were prepared by weighing 20.5 g of the compositions of Examples 4 and 5, and combining each with 27.5 g of 2-[(butylcarbamoyl)oxy]ethyl acrylate, 0.5 g of diphenyl(2,4,6-trimethylbenzoyl)phosphine oxide and 1.5 g of 2-Hydroxy-2-methylpropiophenone in 4 oz. plastic jars. The components were homogenized by mixing in a DAK mixer for 2 minutes at 3000 RPM.

Commercially available PureRad™ L7000 EB- and UV-curable adhesive available from Ashland is provided as a comparative example. Viscosity was measured by AR1000 rotary viscometer at a shear rate of V1=1 seconds⁻¹ and V2=-100 seconds⁻¹ at 25° C.

TABLE 6

Adhesive Composition Viscosity Data

| Adhesive | Inv. Example 4 | Inv. Example 5 | Comparative -- Ashland L 7000 |
|---|---|---|---|
| V1 (cP) | 472 | 1035 | 707 |
| V2 (cP) | 409 | 927 | 567 |

Laminated structures were prepared by applying the adhesives with a flexo hand proofer with a 7.19 BCM anilox to opaque polyethylene film. The substrates with the adhesives were then laminated to a polypropylene film by placing the polypropylene film over the adhesive layer and rolling with a rubber roller to ensure good contact. The films were treated with 1 pass at 0.9 kW in a Corona Supplies Ltd type FP6000 corona treater. The structures were cured by an UV curing rig with a mercury lamp at a dose of one pass at 400 WPI and 200 fpm.

Lamination bond strengths of the laminates were determined as follows, employing the T-peel test of ASTM D1876. One inch wide strips of the laminate were cut and one end of the strips were delaminated using ethyl acetate solvent. The delaminated ends of the strips were attached to jaws of Instron (Mode l3342) tensile testing machine and the laminated structures were peeled apart at a separation speed 12 inches/minute. The force required to peel the laminates was recorded as grams force per linear inch. The obtained bond strengths are reported in Table 7 as average and maximum. Table 7 shows that the adhesive compositions described herein perform better than the Ashland's PureRad L7000 adhesive at selected conditions.

TABLE 7

Lamination Bond Strength Results

| Adhesive | Avg./Max [gf/in] |
|---|---|
| Inv. Example 4 | 83/138 |
| Inv. Example 5 | 86/149 |
| Comparative- Ashland PureRad L7000 adhesive | 27/146 |

Examples 6 and 7—Evaluation of UV LED Adhesive

The adhesive composition of Example 6 was prepared by combining 78.4 g of the inert urethane polymer in ethylenically unsaturated monomer of Example 1, 19.6 g of propoxylated neopentyl glycol diacrylate, and 2.0 g of diphenyl(2,4,6-trimethylbenzoyl)phosphine oxide in 4 oz. plastic jar. The combination was homogenized by mixing in a DAK mixer for 2 minutes at 3000 RPM. An adhesive of Example 7 was prepared in the same manner, this time using 78.4 g of the inert urethane polymer in ethylenically unsaturated monomer of Example 2. Viscosity was measured by AR1000 rotary viscometer at a shear rate of V1=1 seconds⁻¹ and V2=-100 seconds' at 25° C.

TABLE 8

|  | Example 6 Inv. Example 1 | Example 7 Inv. Example 2 |
|---|---|---|
| V1 (cP) | 2415 | 2251 |
| V2 (cP) | 4496 | 4235 |

Lamination structures were prepared by applying the adhesive to either Incada Exel board or an oriented polypropylene film. The film was treated with 1 pass at 0.9 kW in a Corona Supplies Ltd type FP6000 corona treater. A layer of film was then placed on top of the initial substrate and the adhesive drawn down between the two by the use of a OKBAR over the entire structure. The structure was cured using GEW UV LED unit @ 16 watts 100 FPM.

Lamination bond strengths of the laminates were determined as follows, employing the T-peel test of ASTM D1876. One inch wide strips of the laminate were cut. One end of each strip was delaminated using ethyl acetate solvent. The delaminated ends of the strip were attached to jaws of Instron (Mode l3342) tensile testing machine. The laminated structure was peeled apart at a separation speed 12 inches/minute. The force required to peel the laminate was recorded as grams force per linear inch. The higher the force, the stronger is the lamination bond. The obtained bond strength is reported in Table 9.

TABLE 9

UV LED Lamination Bond Results

| Adhesive | Avg./Max [gf] |
|---|---|
| Inv. Adhesive of Example 6 | 98 board tear |
| Inv. Adhesive of Example 7 | 102 board tear |

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. An actinically curable adhesive composition, suitable for sealing flexible packaging, comprising:
   (A) an inert urethane polymer;
   (B) an ethylenically unsaturated component selected from at least one monofunctional ethylenically unsaturated monomer or oligomer, at least one multifunctional ethylenically unsaturated monomer or oligomer, and combinations thereof, wherein the ethylenically unsaturated component disperses the inert urethane polymer.

2. The actinically curable adhesive composition of claim 1, wherein the inert urethane polymer comprises a polyol and a polyisocyanate.

3. The actinically curable adhesive composition of claim 2, wherein the polyol comprises a first diol having a molecular weight of 50 to 2000 Daltons, and a second polymeric diol having a weight average molecular weight of about 425 to about 3000 Daltons.

4. The actinically curable adhesive composition of claim 3, wherein the first diol is selected from aliphatic diols, polyether diols and polycaprolactone diols and combinations thereof.

5. The actinically curable adhesive composition of claim 3, wherein the polymeric diol is selected from polyether diols, polycaprolactone diols, polypropylene glycols, and alpha-hydro omega-hydroxy-poly(oxy-1,4-butyldiyl).

6. The actinically curable adhesive composition of claim 2, wherein the polyisocyanate is selected from aromatic diisocyanates, aliphatic diisocyanates, 4,4'-diphenylmethane diisocyanate, 4,4'-dicyclohexyl diisocyanate, hexamethylene diisocyanate, meta-tetra methylene-xylene diisocyanate, isophorone diisocyanate, toluene diisocyanate and isomers thereof, 1,5-naphthylene diisocyanate, 2,4-diphenylmethane diisocyanate, 4,4'-diphenylmethane diisocyanate, hydrogenated 2,4-diphenylmethane diisocyanate, hydrogenated 4,4'-diphenylmethane diisocyanate, xylylene diisocyanate, tetramethyl xylylene diisocyanate, 4,4'-diphenyl dimethyl-methane diisocyanate, di-diphenylmethane diisocyanate, tetraalkylene diphenylmethane diisocyanate, 4,4'-dibenzyl diisocyanate, 1,3-phenylene diisocyanate, 1,4-phenylene diisocyanate, 1-methyl-2,4-diisocyanatocyclohexane, 1,6-diiso-cyanato-2,2,4-trimethyl hexane, 1,6-diisocyanato-2,4,4-trimethyl hexane, 1-isocyanatomethyl-3-isocyanato-1,5,5-trimethyl cyclohexane, chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate, dicyclohexylmethane diisocyanate, cyclo-hexane-1,4-diisocyanate, ethylene diisocyanate, phthalic acid-bis-isocyanatoethyl ester; diisocyanates containing reactive halogen atoms and combinations thereof.

7. The actinically curable adhesive composition of claim 2, wherein the inert urethane polymer includes a chain extending component.

8. The actinically curable adhesive composition of claim 7, wherein the chain extending component is selected from difunctional amines, hydrazines, diols, and combinations thereof.

9. The actinically curable adhesive composition of claim 7, wherein the chain extending component is present in the inert urethane polymer in an amount of 60%-140%, based on the equivalents of unreacted isocyanate (—NCO) groups on the urethane prepolymer.

10. The actinically curable adhesive composition of claim 7, wherein the chain extending component of the inert urethane polymer further comprises a monoamine.

11. The actinically curable adhesive composition of claim 1, wherein the ethylenically unsaturated component is selected from mono- and multi-functional acrylates, methacrylates, and combinations thereof.

12. The actinically curable adhesive composition of claim 1, wherein the ethylenically unsaturated component is selected from 2-hydroxyethyl acrylate, 2-[(butylcarbamoyl) oxy]ethyl acrylate, 4-hydroxybutyl acrylate, propoxylated neopentyl glycol diacrylate, amine-modified polyether acrylates, poly(oxy-1,2-ethanediyl), alkoxylated aliphatic diacrylate, alkoxylated neopentyl glycol diacrylate, 1,4-butanediol diacrylate, 1,3-butylene glycol diacrylate, cyclohexane dimethanol diacrylate, diethylene glycol diacrylate, dipropylene glycol diacrylate, 1,6- hexanediol diacrylate, neopentyl glycol diacrylate, polyester diacrylate, polyethylene glycol (200) diacrylate, polyethylene glycol (400) diacrylate, polyethylene glycol (600) diacrylate, tetraethylene glycol diacrylate, tricyclodecane dimethanol diacrylate, triethylene glycol diacrylate and tripropylene glycol diacrylate, ethoxylated (3) trimethylolpropane triacrylate, ethoxylated (6) trimethylolpropane triacrylate, ethoxylated (9) trimethylolpropane triacrylate, ethoxylated (15)trimethylolpropane triacrylate, ethoxylated (20) trimethylolpropane triacrylate, pentaerythritol triacrylate, propoxylated (3) glyceryl triacrylate, propoxylated (3) glyceryl triacrylate, propoxylated (5.5) glyceryl triacrylate, propoxylated (3) trimethylolpropane triacrylate, propoxylated (6) trimethylolpropane triacrylate, trimethylolpropane triacrylate and tris-(2-hydroxyethyl)-isocyanurate triacrylate, di-(trimethylolpropane)-tetraacrylate, ethoxylated (4) pentaerythritol tetraacrylate, polyester tetraacrylate, dipentaerythritol pentaacrylate, pentaacrylate ester and pentaerythritol tetraacrylate, epoxy acrylate oligomers, polyester acrylate oligomers, ethoxylated acrylate oligomers, unsaturated polyester oligomers, polyamide acrylate oligomers, polyimide acrylate oligomers, and urethane acrylate oligomers and methyl acrylate oligomers, and combinations thereof.

13. The actinically curable adhesive composition of claim 1, wherein the inert urethane polymer is present in in the adhesive composition in an amount of 10 wt % to 90 wt %.

14. The actinically curable adhesive composition of claim 1, further comprising at least one photoinitiator.

15. The actinically curable adhesive composition of claim 1, wherein the composition is solventless.

16. The actinically curable adhesive composition of claim 1, wherein the composition is a one component adhesive system.

17. A flexible package comprising flexible substrate material configured to form a package, wherein ends of flexible substrate material are bonded together with the actinically curable adhesive composition of claim 1, wherein the actinically curable adhesive composition has been cured with actinic radiation.

18. A flexible package comprising two flexible sheets configured to form a package, the flexible sheets are laminated together with the adhesive composition of claim 1 that has been cured with electron beam radiation or UV radiation.

19. A laminate structure comprising a first substrate material laminated to a second substrate material with the actinically curable adhesive composition of claim 1 that has been exposed to actinic radiation.

20. A method for preparing an actinically curable adhesive composition, suitable for sealing flexible packaging, comprising the steps of:
(A) synthesizing a urethane prepolymer from at least one polyol and at least one polyisocyanate;
(B) chain extending the urethane prepolymer in the presence of an ethylenically unsaturated component to provide an inert urethane polymer, wherein the ethylenically unsaturated component is selected from at least one monofunctional ethylenically unsaturated monomer or oligomer, at least one multifunctional ethylenically unsaturated monomer or oligomer, and combinations thereof, wherein the ethylenically unsaturated component disperses the inert urethane polymer.

21. The actinically curable adhesive composition of claim 8, wherein the difunctional amines are selected from methylene diamine, ethylene diamine, diamino cyclohexane, hexamethylene diamine, piperazine, isophorone diamine, and combinations thereof.

* * * * *